United States Patent [19]

Schommler et al.

[11] Patent Number: 4,563,930

[45] Date of Patent: Jan. 14, 1986

[54] MACHINE FOR LONGITUDINALLY CUTTING AND GROOVING A LENGTH OF MATERIAL, ESPECIALLY CORRUGATED BOARD

[75] Inventors: Manfred Schommler, Quickborn-Heide; Arthur Dirks, Hamburg, both of Fed. Rep. of Germany

[73] Assignee: Werner H. K. Peters Maschinenfabrik GmbH, Fed. Rep. of Germany

[21] Appl. No.: 643,671

[22] Filed: Aug. 22, 1984

Related U.S. Application Data

[63] Continuation-in-part of Ser. No. 438,606, Nov. 2, 1982, abandoned.

[30] Foreign Application Priority Data

Nov. 11, 1981 [DE] Fed. Rep. of Germany ... 8132018[U]

[51] Int. Cl.⁴ .......................... B26D 1/24; B26D 5/02
[52] U.S. Cl. ........................................ 83/862; 83/479; 83/481; 493/361; 493/365
[58] Field of Search ................. 83/862, 863, 479, 481; 493/361, 365, 37

[56] References Cited

U.S. PATENT DOCUMENTS

| | | |
|---|---|---|
| 1,122,268 | 12/1914 | Feeley . |
| 1,278,766 | 9/1918 | Seymour . |
| 1,286,308 | 12/1918 | Hawkins . |
| 1,316,064 | 9/1919 | Seymour et al. . |
| 1,888,436 | 11/1932 | Richards . |
| 1,959,424 | 5/1934 | Hawkins ........................ 83/479 X |
| 2,393,586 | 1/1946 | Bruker . |
| 2,396,315 | 3/1946 | Bruker . |
| 2,418,066 | 3/1947 | Bruker . |
| 2,756,050 | 7/1956 | Matthews et al. . |
| 2,950,658 | 8/1960 | Moser et al. . |
| 3,307,441 | 3/1967 | Saunders et al. . |
| 3,408,886 | 11/1968 | David . |
| 3,489,043 | 1/1970 | Dent . |
| 4,224,847 | 9/1980 | Tokuno ........................ 83/479 X |
| 4,242,934 | 1/1981 | Coburn ........................ 83/479 X |
| 4,328,727 | 5/1982 | Tokuno ........................ 83/479 X |

FOREIGN PATENT DOCUMENTS

| | | |
|---|---|---|
| 2055313 | 10/1975 | Fed. Rep. of Germany . |
| 2306296 | 10/1976 | Fed. Rep. of Germany . |
| 1020321 | 2/1966 | United Kingdom . |

*Primary Examiner*—Frank T. Yost
*Attorney, Agent, or Firm*—Andrus, Sceales, Starke & Sawall

[57] ABSTRACT

An apparatus for longitudinally cutting and grooving a continuously moving length of material. The device has at least two cutting and grooving units, each provided with separate cutting and grooving tools. The units are positioned at different vertical levels and are vertically movable in unison in the same direction to selectively place one of the units in position for operating and the other unit in position for adjustment.

9 Claims, 4 Drawing Figures

MACHINE FOR LONGITUDINALLY CUTTING AND GROOVING A LENGTH OF MATERIAL, ESPECIALLY CORRUGATED BOARD

This application is a continuation-in-part of co-pending application for U.S. patent Ser. No. 06/438,606, filed Nov. 2, 1982, now abandoned.

The innovation relates to a machine for longitudinally cutting and grooving a continuously oncoming length of material arriving without interruption, especially corrugated board, comprising a transversal short cutter and a longitudinal cutting and grooving device series-arranged thereto and provided with at least two longitudinal cutting and grooving units arranged at different levels and capable of height adjustment while being provided with separate cutting and grooving tools, whereto the leading edge of the length of material severed by the transversal short cutter may be selectively fed.

Such a machine is known (German publication letter No. 2 306 296). The cutting and grooving stations are guided and arranged one above another within stands arranged to form a square. The leading edge of the length of material severed by the transversal short cutter is selectively supplied to one of the two longitudinal cutting and grooving stations with the aid of an adjustable guiding means. For the purpose of a change of format the cutting and grooving stations are moved from a working position into their position of rest. The known machine, however, suffers from some drawbacks. As each cutting and grooving station has its own working plane, the length of material is deviated in a greater or lesser degree which may result in unfavourable stresses becoming effective on the material during the runoff of the production. In addition, it is extremely difficult to carry out a change of format at full production speed without any waste occurring. In such a case, the reversible guiding means must be actuated exactly at that point of time at which the rear end of the severed length of material has just left it and the leading edge of the new length of material has not yet reached the rigid guide of the so far operating cutting and grooving station. Any deviation from this point of time will lead to a discontinuous transition.

A machine has furthermore become known for longitudinally cutting and grooving lengths of material in which the longitudinal cutting and grooving stations are retained at the end of a lever arrangement pivotally supported about centrally (German disclosure letter No. 27 22 233).

Because of the balance of loads as provided it is possible to effect with the aid of a suitable adjusting means a quick adjustment of the cutting and grooving stations respectively into the working position and into the position of rest. The guiding means arranged stationarily between the stations are also pivoted automatically and remain always aligned with respect to each other, so that additional adjusting means to actuate the guiding means are not necessary. The respectively operating cutting and grooving station always operates in the same working plane. This results in very favourable stresses on the material during the entire runoff of the production. What is disadvantageous, however, is that when arranged on a rocker, the cutting and grooving tools are respectively seated on one single shaft. The common arrangement of cutting and grooving tools on one single shaft is undesirable for many reasons.

The innovation is based upon the problem of providing a machine for longitudinally cutting and grooving a length of material continuously oncoming without interruption, especially corrugated board, enabling processing of the length of material with separate tools for cutting and grooving without any noticeable mechanical stress.

In a machine of the type mentioned at the beginning, this problem is solved in that the longitudinal cutting and grooving units are disposed one after the other in the working direction, with a track guide above the lower and beneath the upper longitudinal cutting and grooving unit connected to the associated said unit in such a manner that the track guide of one unit is respectively constantly aligned with the processing plane of the other unit and the longitudinal cutting and grooving units are coupled for synchronous height adjustment.

The machine according to the innovation does without a reversible guiding device. The latter not least because the processing planes of the cutting and grooving units when being put to use are respectively brought into one single working plate. In the case of the innovation it was started out from the knowledge that prior to a format change both cutting and grooving units can be adjusted in height in a direction such that the cutting and grooving unit that has been at rest before, will approach the working plane. At the same time the cutting and grooving unit still in operation will move away from the working plane which will lead to a certain, however transient deviation of the length of material. At the moment, when the transverse short cutter severs the length of material the new cutting and grooving unit may quickly be run into the working plane, while the end of the issuing length of material runs out while being slightly deviated from the cutting and grooving unit that had been previously in operation. The forward edge of the severed length of material only needs to be moved onward in the same plane, in order to arrive now in the processing plane of the new cutting and grooving unit.

In this manner it is possible to perform a so-called permanent run in one single working plane also for grooving and cutting tools arranged on separate shafts. The guides associated with the cutting and grooving units, in this operation, are arranged in such a manner that a deviation of the length of material during the change of format is taking place only to a slight extent which cannot lead to any stress on the material worth mentioning.

According to one embodiment of the innovation provision is made for the longitudinal cutting and grooving units arranged in the machine frame to be disposed directly adjacent each other. In this manner a compact machine is obtained. Special guides between successive cutting and grooving units may be dispensed with.

According to another embodiment of the innovation provision is made for a stationary guide aligned with the processing plane of the tools to be connected with the foremost cutting and grooving unit in front of said unit. The guide serves to facilitate the running-in of the front edge of a severed length of material when the associated cutting and grooving unit has been brought into working position.

Another embodiment of the innovation provides for two pairs of rolls to be arranged at the exit of the rearmost longitudinal cutting and grooving unit, with the nip of one pair of rolls being aligned with respect to the processing plane of the unit and the nip of the other pair of rolls being aligned with respect to the plane of the associated track guide. The pairs of rolls serve to guide and withdraw the processed length of material, in order to transport the latter to a transverse cutting device. The pairs of rolls are adjusted together with the rearmost unit, with only one pair being in use at a time during normal operation.

So as to keep the path of adjustment small in case of a change of format, provision is made in another embodiment of the innovation for the distance between the processing plane of the longitudinal cutting and grooving units to be slightly greater than the diameter of the cutting and grooving tools. Thereby, a relatively small path of adjustment is obtained which for its part makes possible a quick ajustment of the cutting and grooving units into the working position and the position of rest, respectively, and thus a permanent running without the length of material having to be braked or certain amounts having to be cut out by the transverse cutter.

With cutting and grooving tools mechanically adjustable on the shafts, in particular, the minimum space between adjacent rolls is limited. But often, groove lines must be formed with a spacing smaller than the minimum spacing mentioned. Therefore, provision is made in another embodiment of the innovation for a height-adjustable grooving unit to be arranged in front of the foremost longitudinal cutting and grooving unit, the processing plane of which being aligned with respect to a processing plane of the two longitudinal cutting and grooving units. If the additional grooving unit is to be employed, the height adjustment thereof must be coupled with that of the other grooving units.

For mounting and adjustment of the cutting and grooving tools different possibilities are imaginable. One of them consisting in simply making the shaft bearings height-adjustable. Another possibility according to the innovation consists in that the longitudinal cutting and grooving units are mounted on a common rack capable of height adjustment by means of a lifting device. With such a machine, all the tool shafts can be supported in stationary rotary bearings, and there is only one single lifting device necessary, in order to selectively put the cutting and grooving units to use. So as to guarantee an unobjectionable permanent running it is, however, necessary that the lifting device be sufficiently efficient to be able to cover the path of adjustment for a change of format within a very short period of time.

In connection with the last mentioned embodiment, provision is made in another further development of the innovation for the cutting and grooving tools of the upper unit to be spaced in working direction and for the cutting and grooving tools of the lower unit to be arranged between them.

Some examples of embodiments of the innovation will be described in more detail in the following by way of drawings.

Figure 1:
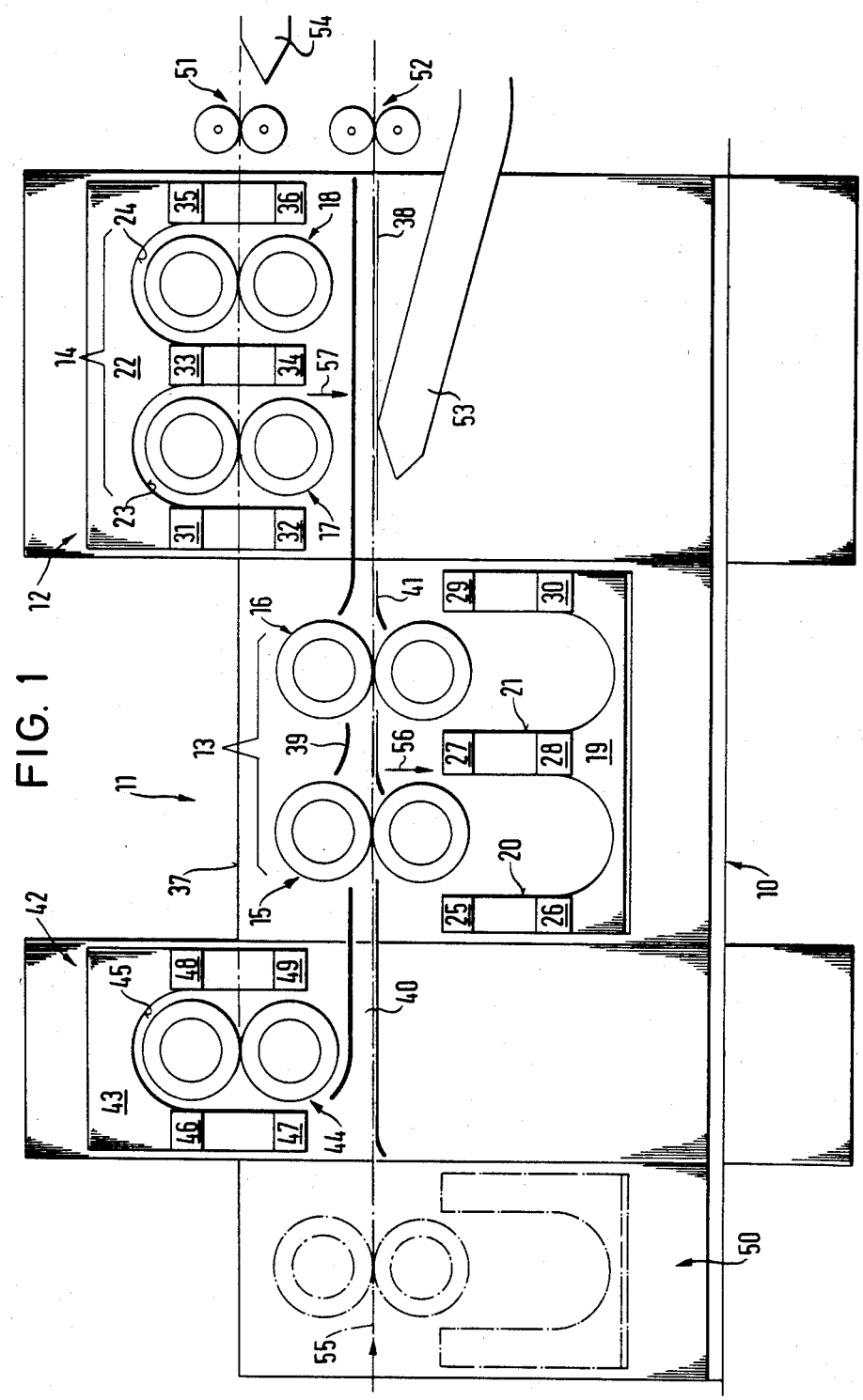
FIG. 1 shows a schematical side view of a first embodiment of a machine according to the innovation.

Prior to enlarging on the details shown in the drawings, it has to be stated that each of the features described and shown is of essential importance to the innovation by itself or in connection with features of the claims.

A machine stand generally designated with 10 has provided therein two longitudinal cutting and grooving stations 11 and 12 each provided with a longitudinal cutting and grooving unit 13 and 14, respectively. The cutting and grooving unit consists of a pair of cutting shafts 15 and a pair of grooving shafts 16. They are built up in a manner per se and essentially consist of a shaft and circular tools for cutting and grooving arranged on the shaft. The tools are capable of being adjusted in a manner known per se with respect to each other and also relatively to the shaft. This is likewise not shown in the drawing. The cutting and grooving unit 14 consists of a pair of cutting shafts 18 and a pair of grooving shafts 17. The construction thereof corresponds to the construction of the pairs of shafts 16 and 15.

The pairs of shafts 15, 16 are supported to be capable of height adjustment in a frame assembly 19. As will be noted, the pairs of shafts 15, 16 are situated in their position in which they are farthest moved upwards. When in the lowermost position, they are disposed within the reception spaces 20 and 21, respectively, of the frame 19. This situation is shown for the pairs of shafts 17, 18 which are supported to be capable of height adjustment in a frame 22 with the aid of a suitable lifting device. The reception spaces are respectively referenced 23 and 24. Associated with the frame 19 are adjusting devices 25 to 30 (only shown schematically), which, with the tool shafts 15, 16 in the lower position are effective to cause adjustment of the tools on the shafts for the purpose of a change of format. Analogously thereto, adjusting devices 31 to 36 are arranged in frame 22.

Connected with the support means for the tool shafts 15, 16 is an upper track guide 37. A lower track guide 38 is correspondingly coupled to the tool shafts 17, 18. A guide 39 is disposed between the tool shafts 15, 16. Finally, a guide 40 is disposed in front of the foremost unit 13 which is aligned with the processing plane of the tool shafts 15, 16 and is likewise adjusted in common with said tool shafts. Cooperating with the tool shafts 15, 16 also is a guide 41 in rear of the pair of tool shafts 16, which is permanently aligned with the guide 38.

Situated before the cutting and grooving station 11 is a grooving station 42 which comprises a frame 43 similar to the frames 19, 22 in the longitudinal cutting and grooving stations 11, 12. It supports for height adjustment a pair of cutting tool shafts 44 which, in the position as shown in FIG. 1, is accommodated by the recess 45 in frame 43. Adjustment means 46 to 49 take care of the adjustment of the grooving tools in case of a change of format.

Another grooving station 50 is arranged in front of the grooving station 42. It is shown in dash-dotted lines and as regards its construction resembles the grooving station 42 so that no particulars will be described in any more detail with respect thereto.

Two pairs of rolls 51, 52 are arranged behind the rearmost longitudinal cutting and grooving station 12. The nip of the pair of rolls 51 is aligned with the processing plane of the tool shafts 17, 18, while the nip of the pair of rolls 52 is aligned with guiding planes of the guide 38. The pairs of rolls 51, 52 serving a function of guidance and transportation are likewise adjusted in height together with the pairs of shafts 17, 18. Further guiding elements are arranged at the exit of the cutting and grooving station 11 and the cutting and grooving station 12 and are designated with 53 and 54, respectively.

A length of corrugated board 55 is introduced into the machine as shown in the direction of the arrow as shown (to the left in FIG. 1). The plane of the length of material 55 shown in FIG. 1 at the same time defines also the working plane of the machine. The length of material 55 is guided along the guide 40 on to the cutting and grooving unit 13 being in operation with the pair of grooving shafts 15 taking care of grooving and the pair of cutting shafts 16 taking care of a corresponding longitudinal cutting of the length of material. The length of material thus processed arrives in guide 38 from guide 41 and via the pair of rolls 52 arrives at a transverse cutting device no more shown here which cuts the processed length of material into individual pieces. The cut-off pieces are finally stacked.

If a change of format is to be carried out, the pairs of shafts 15 and 16 are adjusted in a downward sense in the direction of the arrow 56. The pairs of shafts 17, 18, too, are adjusted in synchronism therewith in a downward sense in the direction of the arrow 57. The guides 40, 39, 41 and 38 as well as the pair of rolls 52 follow this movement so that the length of material is slightly deviated downwardly. In this manner, the processing plane of the cutting and grooving unit 14 approaches the working plane defined by the length of material 55. But before the cutting and grooving unit 14 reaches the latter, a transverse short cutter (not shown) in front of the grooving station 50 cuts through the length of material. At the same time, a quick adjustment of the units 13 and 14 is taking place into the lower end position, so that the forward end of the cut-off length of material runs onto the guide 37 and between the pairs of tool shafts 17 and 18 so that at this location the grooving and cutting may be performed with a new format. The tools on the pairs of tool shafts 15 and 16 disposed in the position which is now the lower one can for their part be adjusted, if this is desired.

As will be noted from FIG. 1, with the operation as shown in FIG. 1, the grooving unit 50, too, is being used. Such use becomes necessary in case the required grooved lines cannot be formed with a pair of grooving tools, here the pair of shafts 15. For such a case, the tool shafts of the grooving station 50 may be adjusted in height synchronously with the tool shafts 15 to 18. This comes equally true also with respect to the pair of tool shafts 44.

As will be recognized from FIG. 1, the individual cutting and grooving units 13, 14 as well as the grooving units 42 and 50 are arranged in series one after the other, but directly adjacent to each other. They are also not superimposed with respect to each other but are offset in height through a minimum distance only, the degree by which they are offset in height being slightly greater than the diameter of the tools, as may be clearly recognized from FIG. 1.

With the machine as described a permanent operation can be guaranteed also in case of change of format with the stress imposed on the length of material during the change of format being at a minimum.

Figure 2:
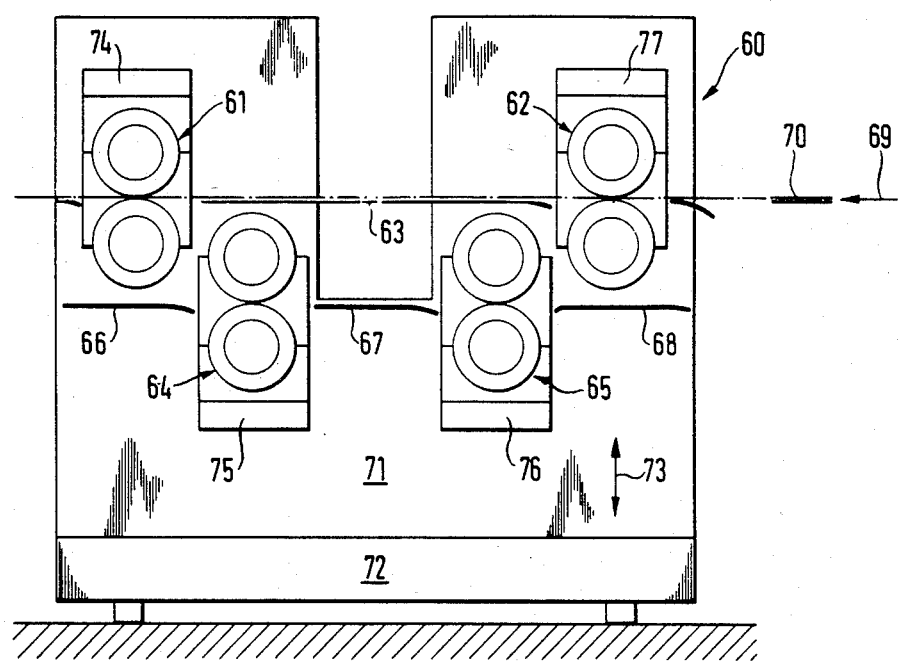
FIG. 2 shows a schematical side view of a second embodiment of a machine according to the innovation.

In the embodiment according to FIG. 2 a machine stand is generally referenced 60. It supports in longitudinally spaced arrangement, an upper pair of cutter shafts 60 and an upper pair of grooving shafts 62. Between the pairs of shafts 61, 62 a guide 63 is situated. The stand 60 supports furthermore a lower pair of cutting shafts 64 and a lower pair of grooving shafts 65. A guide 66 is arranged in front of the pair of shafts 64. Between the pairs of shafts 64, 65 a guide 67 is situated with a guide 68 arranged behind the pair of shafts 65. The guides 66, 67 and 68 are disposed in the working plane of a cutting and grooving unit defined by the pairs of shafts 65 and 64. The pairs of shafts 61 and 62 define an upper longitudinal cutting and grooving unit being in its working position as shown in FIG. 2. A length of corrugated board 70 supplied in the direction of the arrow 69 is grooved and longitudinally cut therein. In FIG. 2 the position of the length of corrugated board 70 defines the working plane. An upper portion 71 of the stand 60 is capable of height adjustment with respect to the lower portion 72 in the direction of the double arrow 73. In FIG. 2 the stand portion 71 is in its lowermost position with the pairs of tool shafts 61 and 62 in the working position. In case of a change of format the upper stand portion 71 is lifted by means of a lifting device so that the length of corrugated board 70 moves through the machine while being slightly deviated upwardly. If a transverse short cutter arranged in front of the machine is actuated, the trailing end of the cut-off length of material is still passing through the pairs of tool shafts 61 and 62, while the forward edge of the next succeeding length of corrugated board is already running onto the guide 68 which has in the meantime been lifted far enough, in order to pass through the pairs of tool shafts 65 and 64 and be processed. A change of format in the opposite sense takes place in the same manner.

It goes without saying that the tools on the tool shafts may again be adjusted manually or automatically in a suitable manner. The appertaining carriages of adjustment are indicated at 74, 75, 76 and 77.

Figure 3:
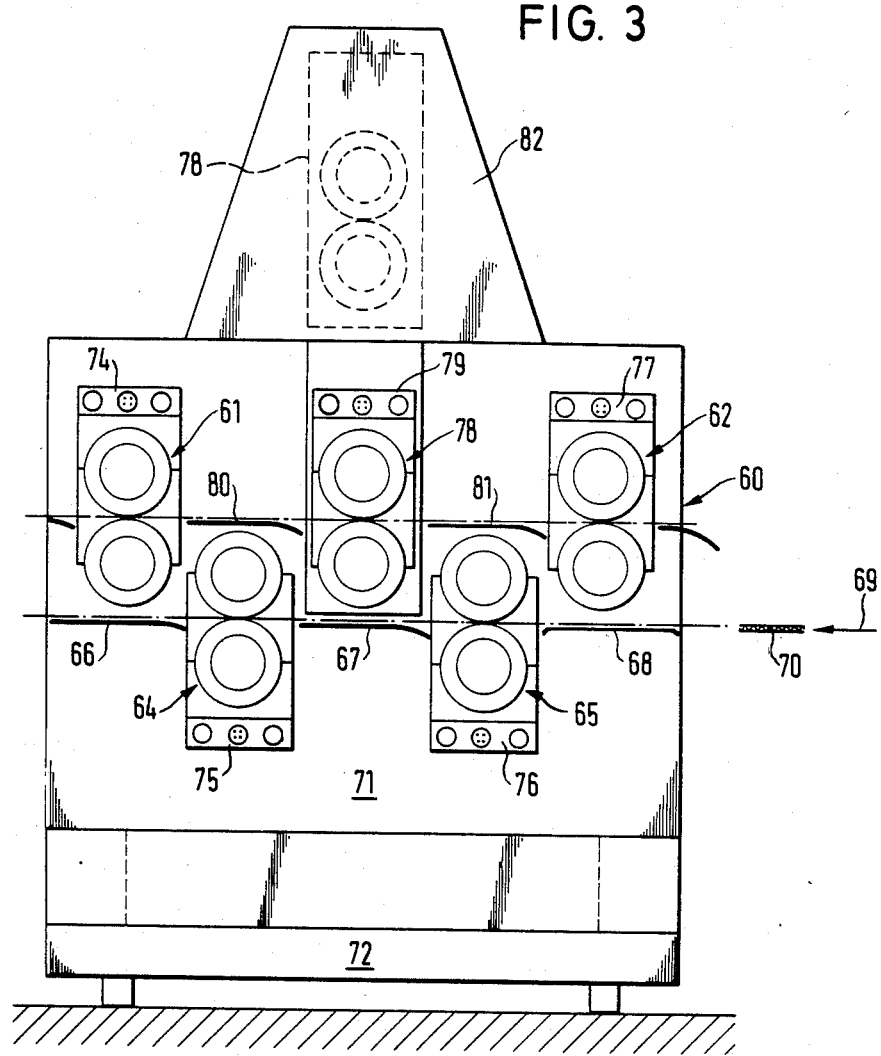
FIG. 3 shows schematically a modification of a machine according to FIG. 2.

With the embodiment according to FIG. 3, essentially the same arrangement is shown as in FIG. 2, so that like parts are provided with like reference numerals. In the center of stand 60 a pair of grooving shafts 78 is mounted for rotation yet stationarily between the pairs of tool shafts 61, 62 and the pairs of tool shafts 64, 65, respectively, thereby being adjustable with the upper portion 71 of the stand in the same manner as the other pairs of tool shafts. A carriage indicated at 79 serves to adjust the grooving tools. Because of the additional grooving unit 78 the guide 63 is replaced by individual guides 80 and 81.

As indicated in broken lines in FIG. 3, however, the grooving unit 78 can be separately moved vertically thereby arriving at an upper portion 82 of the stand, whereby the grooving unit 78 is brought into a position of rest. Besides, the change of format described in connection with FIG. 2 is completed in FIG. 3, and the pairs of tool shafts 64 and 65 process the length of corrugated board 70 which is still supplied at the same level as before. The upper portion 71 of the stand in this operation is situated in the uppermost position.

Referring to FIG. 1, the slitter-scorer units are supported on members 90 and 92 which are driven by hydraulic cylinders 94 and 96 fixedly mounted to frame 10. Actuation of hydraulic cylinders 94 and 96 adjusts the height of the slitter-scorer units on support members 90 and 92.

Figure 4:
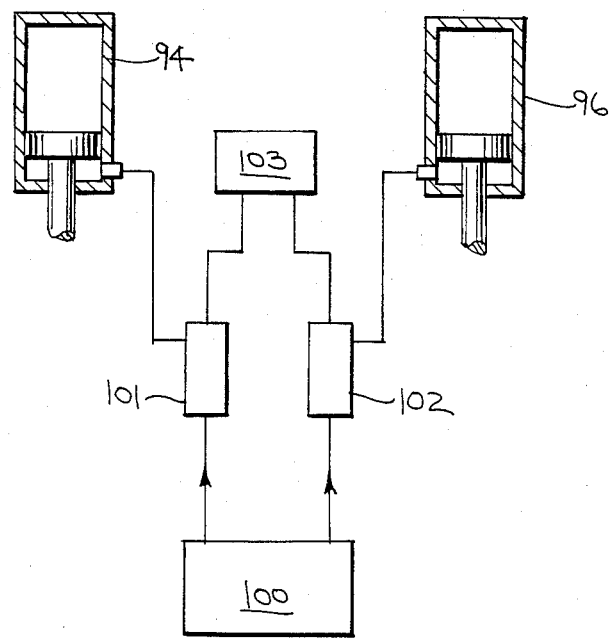
FIG. 4 shows schematically means for synchronous adjustment of the slitter-scorer units.

FIG. 4 illustrates synchronous height adjustment means for the hydraulic cylinder lifting devices 94 and 96. Hydraulic cylinders 94 and 96 are supplied by a hydraulic unit 100, and the outputs of hydraulic source 100 are connected to cylinders 94 and 96 through proportional valves 101 and 102, respectively. The proportional valves 101 and 102 are pre-established, or are automatically controlled as at 103 by a given program. If proportional valves 101 and 102 receive control signals of the same value, the hydraulic cylinders 94 and 96 receive the same adjusting pressure and are actuated sychronously.

In FIG. 2, hydraulic cylinders 98 and 99 are fixedly mounted to frame 72 for lifting and lower of complete unit 71.

Reference is made to David U.S. Pat. No. 3,408,886 showing lifting means for the noted units, to Tokuno U.S. Pat. No. 4,328,727 showing means for lifting and lowering the tools of slitter-scorer apparatus, and to Tokuno U.S. Pat. No. 4,224,847 showing means for adjusting the height of the slitter-scorer units. A transverse cutter is shown in the noted U.S. Pat. No. 4,328,727 and is typically used in corrugating machines for corrugated boards in front of a slitter-scorer unit.

We claim:

1. A machine for longitudinally cutting and grooving a length of material continuously oncoming without interruption, especially corrugated board, comprising a longitudinal cutting and grooving device having at least two longitudinal cutting and grooving units arranged at different levels and capable of height adjustment provided with separate cutting and grooving tools, to which the front edge of a length of material is capable of being selectively supplied, characterized in that the longitudinal cutting and grooving units (13, 14) are disposed one after the other in the working direction, with a track guide above the lower and beneath the upper longitudinal cutting and grooving unit respectively connected to the associated said unit in such a manner that the track guide of one unit is respectively constantly aligned with the processing plane of the other unit and the longitudinal cutting and grooving units (13, 14) are coupled for synchronous height adjustment to apply said lower unit to the material by simultaneously moving the lower and upper units to an upper height position and to apply the upper unit to the material by simultaneously moving the lower and upper units to a lower height position.

2. A machine according to claim 1, characterized in that the longitudinal cutting and grooving units (13, 14) are arranged in the machine frames (19, 22) directly adjacent to each other.

3. A machine according to claim 1, characterized in that a stationary guide (40) aligned with the processing plane of the rolls is connected to the forward longitudinal cutting and grooving unit (13) in front of said unit (13).

4. A machine according to claim 1, characterized in that two pairs of rolls (51, 52) are arranged at the exit of the rear longitudinal cutting and grooving unit (14), the nip of the one pair of rolls (51) being aligned with respect to the processing plane of the unit (14) and the nip the other pair of rolls (52) being aligned with the plane of the associated web guide (38).

5. A machine according to claim 1, characterized in that the distance in height between the processing planes of the longitudinal cutting and grooving units (13, 14) is slightly greater than the diameter of the cutting and grooving tools.

6. A machine according to claim 1, characterized in that at least one height-adjustable grooving unit (44) is arranged in front of the forward longitudinal cutting and grooving unit (13) the processing plane of which is aligned with one processing plane of the two longitudinal cutting and grooving units (13, 14).

7. A machine according to claim 1, characterized in that the longitudinal cutting and grooving units (61, 62, 64, 65) are supported in a common stand (60) capable of being adjusted in height by means of a lifting device.

8. A machine according to claim 7, characterized in that the cutting and grooving tools (61, 62) of the upper unit are spaced from each other in the working direction and the cutting and grooving tools (64, 65) of the lower unit are arranged between the latter.

9. A machine according to claim 8, characterized in that another grooving unit (78) is arranged between the upper cutting and grooving tools (61, 62) with a working plane aligned with respect to the latter, preferably also between the lower cutting and grooving tools (64, 65).

* * * * *